US006449365B1

(12) United States Patent
Hodges et al.

(10) Patent No.: US 6,449,365 B1
(45) Date of Patent: Sep. 10, 2002

(54) METHOD AND APPARATUS PROVIDING NOTIFICATION OF NETWORK CONDITIONS

(75) Inventors: Michael P. Hodges, Apex; Steven J. Munsat; John J. Westerhoff, both of Chapel Hill; Robert Pombrio, Raleigh, all of NC (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/465,348

(22) Filed: Dec. 16, 1999

(51) Int. Cl.[7] .......................... H04M 1/24; H04M 3/08; H04M 3/22

(52) U.S. Cl. ..................... 379/903; 379/1.01; 379/2; 379/9; 379/9.02; 379/32.01; 379/33

(58) Field of Search ................. 379/1.01, 1.03, 379/2, 9, 9.01, 9.02, 9.03, 32.01, 33, 22, 26.01, 29.02, 133, 134

(56) References Cited

U.S. PATENT DOCUMENTS

| 4,972,453 | A | * | 11/1990 | Daniel, III et al. ........... 379/10 |
| 5,721,913 | A | * | 2/1998 | Ackroff et al. ............. 395/614 |
| 5,875,242 | A | * | 2/1999 | Glaser et al. ................ 379/207 |
| 5,917,898 | A | * | 6/1999 | Bassa et al. ................ 379/133 |
| 5,974,114 | A | * | 10/1999 | Blum et al. ..................... 379/9 |
| 6,018,567 | A | * | 1/2000 | Dulman ....................... 379/34 |
| 6,032,184 | A | * | 2/2000 | Cogger et al. .............. 709/223 |
| 6,141,777 | A | * | 10/2000 | Cutrell et al. ................. 714/47 |
| 6,160,477 | A | * | 12/2000 | Sandelman et al. ......... 340/506 |
| 6,243,838 | B1 | * | 6/2001 | Liu et al. ...................... 714/57 |

* cited by examiner

Primary Examiner—Sinh Tran
Assistant Examiner—Quoc Tran

(57) ABSTRACT

A client/server interface enables a user to provide information to a server relating to a change in the status of a network resource. The user also identifies an intended recipient of a notification message regarding the status of the network resource. The server then automatically handles the transmission of a notification message to the designated recipient or group of recipients.

24 Claims, 9 Drawing Sheets

METHOD AND APPARATUS PROVIDING NOTIFICATION OF NETWORK CONDITIONS

FIELD OF THE INVENTION

The present invention relates to telecommunication networks and, more particularly, to a method and apparatus for providing notification of network conditions.

BACKGROUND OF THE INVENTION

In large telecommunications networks, various systems and personnel monitor the network resources to ensure that the network is performing properly. When a problem occurs with one of the network resources, such as a switch or a router, a person responsible for monitoring that piece of equipment may call a central monitoring facility to report the equipment failure. The central monitoring facility personnel may relay this information to each of the individuals, groups, departments, etc. concerned with maintaining the piece of failed equipment and to traffic engineers concerned with diverting network traffic around the failed equipment.

One drawback with such conventional monitoring practices is that personnel at the central monitoring facility must individually call each of the particular parties involved in resolving the problem and rerouting the traffic. This typically requires a considerable amount of time associated with looking up telephone numbers and pager numbers and then informing the various designated parties of the problem. In telecommunications networks, network downtime may be very costly to the end user. Therefore, manually placing telephone calls to alert various personnel adds to the downtime and further increases the costs associated with network downtime. Another drawback with such systems is that the central monitoring facility personnel get tied up calling maintenance personnel and are taken away from other duties that they perform.

SUMMARY OF THE INVENTION

There exists a need for a system that facilitates notifying personnel of network conditions.

These and other needs are met by the present invention, where a client/server interface allows users to input information regarding network conditions and to select recipients for a notification message. The server then handles the transmission of a notification message to the designated recipients.

According to one aspect of the invention, a method for providing notification regarding a change in a telecommunications network is provided. The method includes receiving information relating to a change in status of a network resource and at least one recipient for notification of the change. The method also includes automatically notifying the at least one recipient.

Another aspect of the present invention provides a computer-readable medium that includes stored sequences of instructions that are executed by a processor. The instructions cause the processor to obtain identifying information from a user and transmit a user interface to the user based on the identifying information. The instructions further cause the processor to obtain information representing a change in status of a network resource and at least one recipient of a notification message and send the notification message to the at least one recipient.

Other features and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

DETAILED DESCRIPTION

Systems and methods consistent with the present invention simplify the process for transmitting a notification message regarding network conditions. A user interacts with a server to input information relating to a network resource problem or failure. The server then handles the transmission of a notification message to the designated recipients.

SYSTEM OVERVIEW

Figure 1:
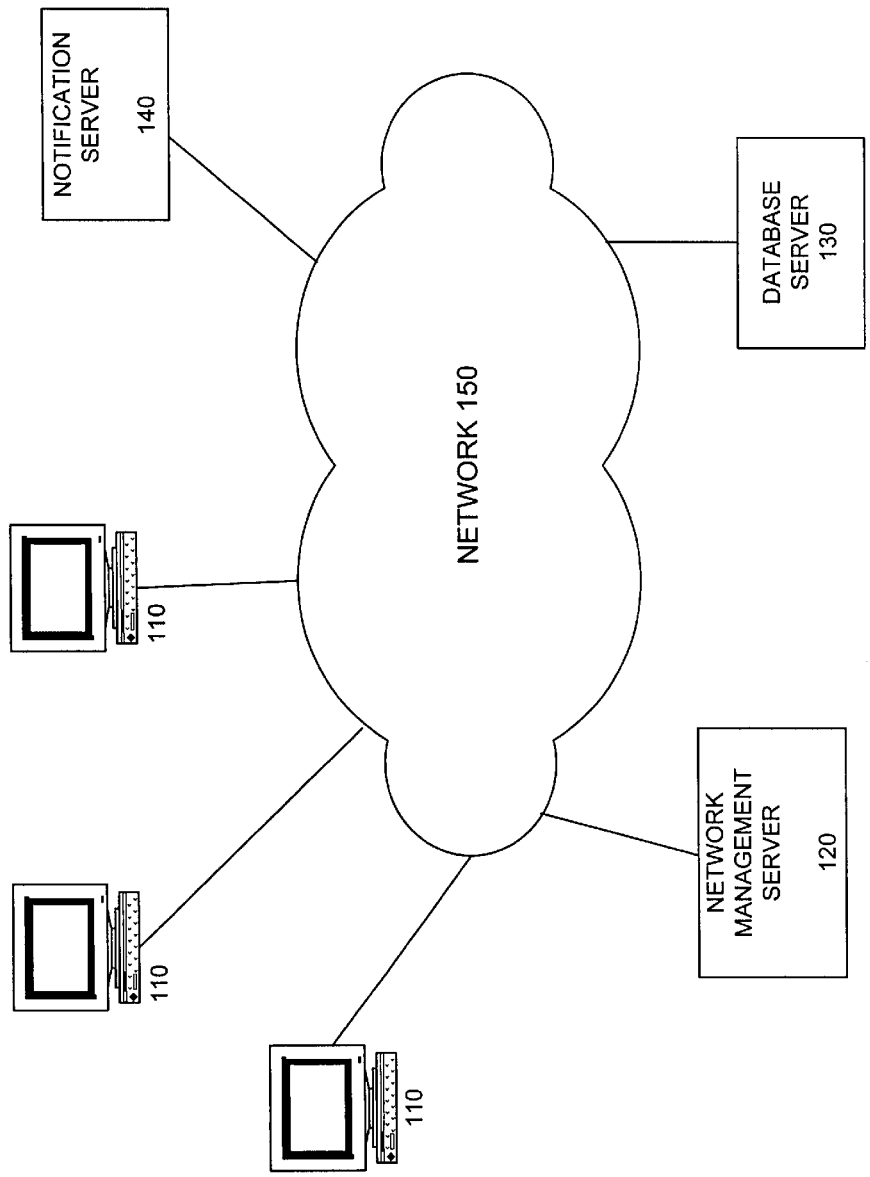
FIG. 1 is an exemplary system in which systems and methods consistent with the present invention may be implemented.

FIG. 1 is an exemplary system 100 in which methods and systems consistent with the present invention may be implemented. The system 100 includes several workstations 110, network management server 120, database server 130 and notification server 140 connected to network 150. Three workstations 110 are shown for simplicity. It should be understood, however, that additional workstations 110 may be included in system 100.

Workstations 110 communicate with network management server 120 over the network 150 via a wired or wireless connection. Workstations 110, consistent with the present invention, may include any type of computer system, such as a personal computer or a laptop, capable of running an Internet browser such as Internet Explorer or Netscape Navigator. Alternatively, the workstations 110 may include "dumb" terminals connected to network 150.

Network management server 120, database server 130 and notification server 140 may also communicate with each other, as described in detail below, over network 150 via wired or wireless connections. The network 150 may include the Internet, a LAN, WAN, intranet or another type of network.

Figure 2:
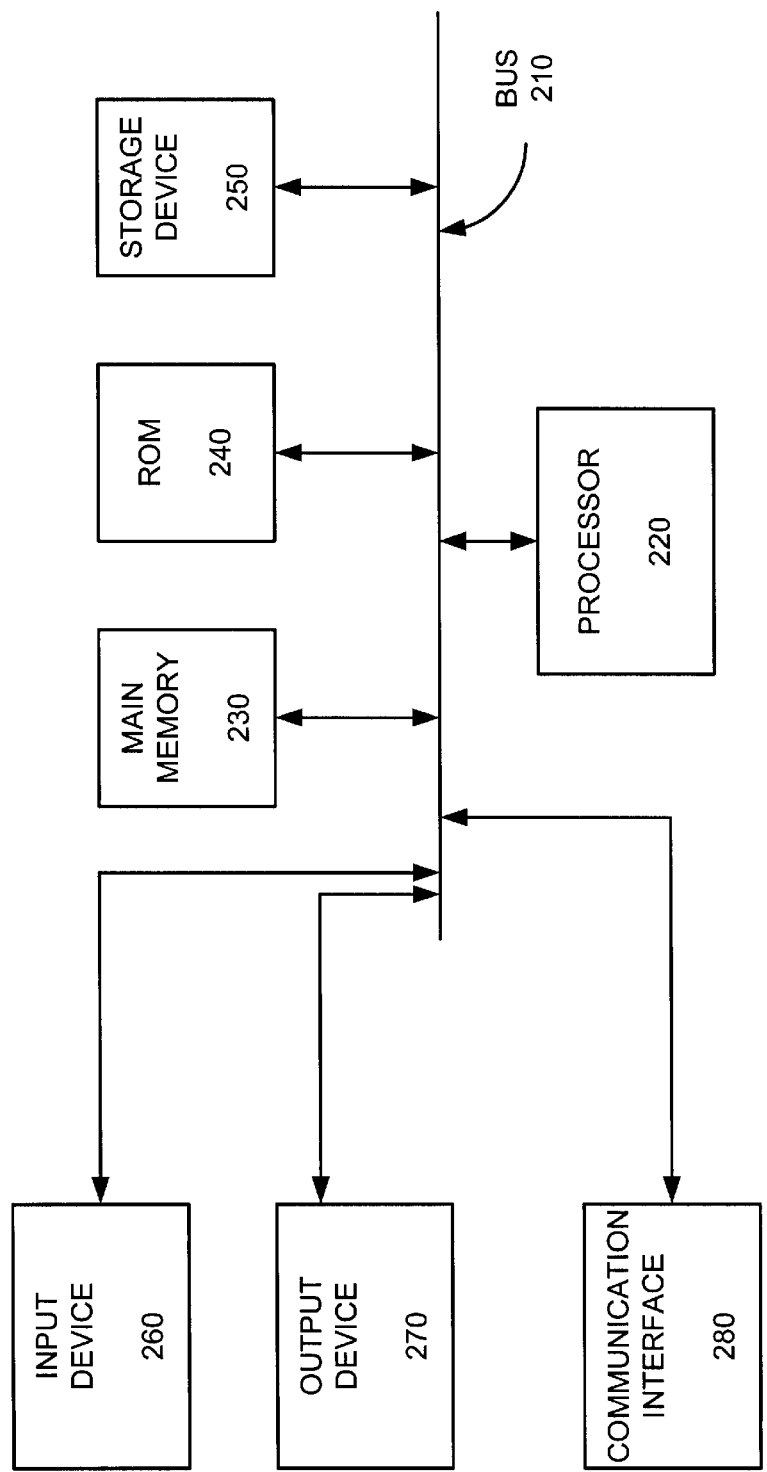
FIG. 2 is an exemplary diagram of the network management server of FIG. 1.

FIG. 2 is an exemplary diagram of network management (NM) server 120 of FIG. 1. NM server 120 includes a bus 210 or other communication medium for communicating information and a processor 220 coupled to bus 210 for processing information. NM server 120 further includes a random access memory (RAM) or other dynamic storage device 230 (referred to as main memory) coupled to bus 210 for storing information and instructions for execution by processor 220. Main memory 230 also may be used to store temporary variables or other intermediate information during execution of instructions by processor 220. NM server 120 also includes a read only memory (ROM) and/or other static storage device 240 coupled to bus 210 for storing static information and instructions for processor 220. A data storage device 250, such as a magnetic disk or optical disk and its corresponding disk drive, can be coupled to bus 210 for storing information and instructions.

NM server 120 also includes an input device 260, an output device 270, and a communication interface 280. The input device 260 may include any conventional mechanism that permits an operator to input information to the NM server 120, such a keyboard, a mouse, a pen, voice recognition and/or biometric mechanisms, etc. The output device 270 may include any conventional mechanism that outputs information to the operator, including a display, a printer, a pair of speakers, etc. The communication interface 280 may include any transceiver-like mechanism that enables the NM server 120 to communicate with other devices and/or systems. For example, the communication interface 280 may include mechanisms for communicating via a data network, such as the Internet, an intranet, LAN or WAN.

The NM server 120, consistent with the present invention, provides a forum for workstations 110 to transmit information regarding a particular telecommunications entity or resource. The NM server 120 also communicates with other servers, such as database server 130 and notification server 140. According to one embodiment, NM server 120 transmits and receives data to/from workstations 110, database server 130 and notification server 140 in response to processor 220 executing sequences of instructions contained in memory 230. Such instructions may be read into memory 230 from another computer-readable medium, such as a data storage device 250, or from a separate device via communication interface 280. Execution of the sequences of instructions contained in memory 230 causes processor 220 to perform the process steps that will be described hereafter. In alternative embodiments, hard-wired circuitry may be used in place of or in combination with software instructions to implement the present invention. Thus, the present invention is not limited to any specific combination of hardware circuitry and software.

Figure 3:
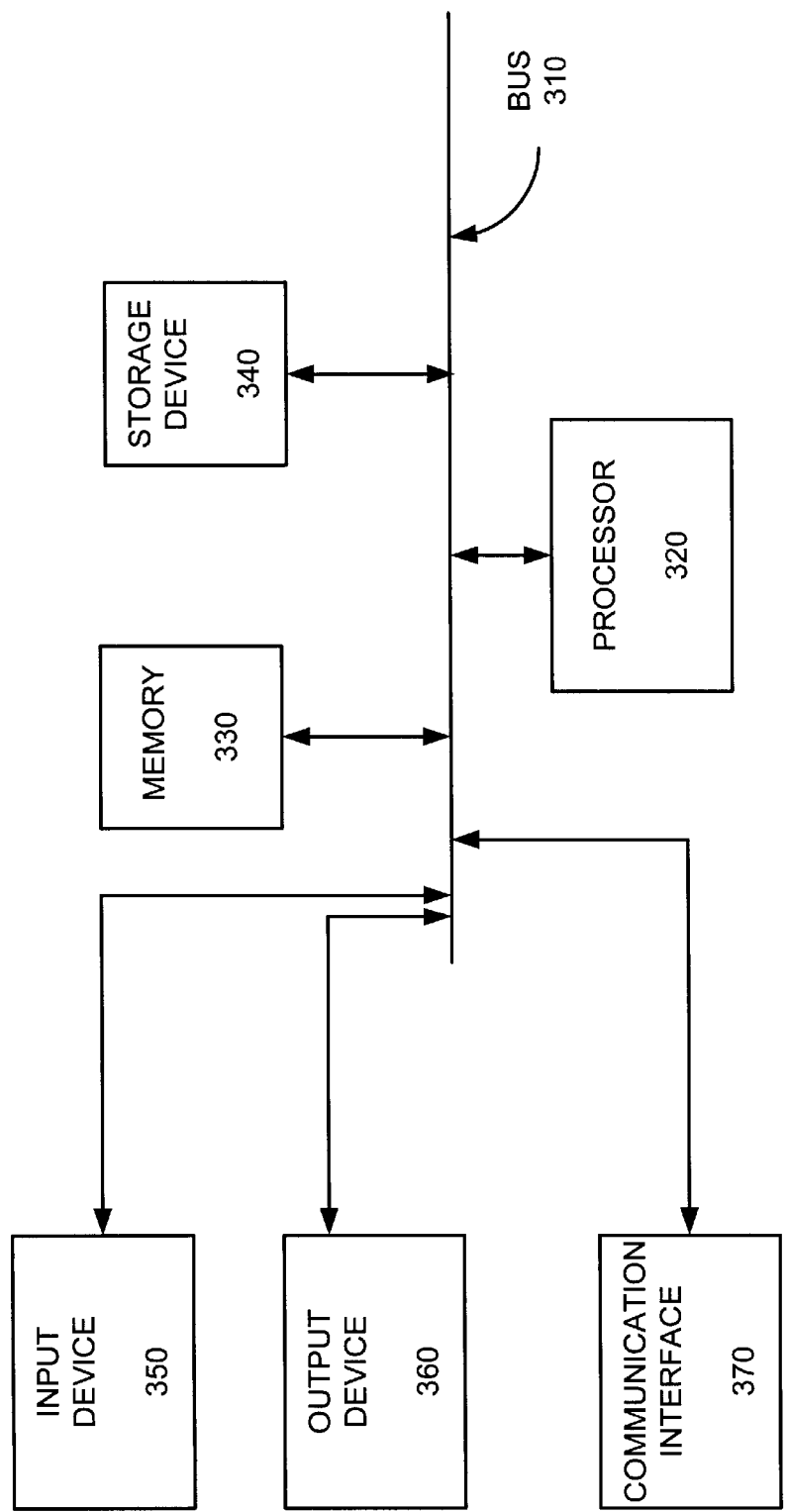
FIG. 3 is an exemplary diagram of the database server of FIG. 1.

Returning to FIG. 1, database server 130 stores information received from network management server 120 and communicates with notification server 140, as described in more detail below. FIG. 3 is an exemplary diagram of the database server 130 of FIG. 1. The database server 130 includes a bus 310, a processor 320, a memory 330, a storage device 340, an input device 350, an output device 360, and a communication interface 370. The bus 310 permits communication among the components of the database server 130.

The processor 320 may include any type of conventional processor or microprocessor that interprets and executes instructions. The memory 330 may include a RAM or another dynamic storage device that stores information and instructions for execution by the processor 320 and/or a ROM or another type of static storage device that stores static information and instructions for use by the processor 320. The storage device 340 may include a magnetic disk or optical disk and its corresponding drive and/or some other type of magnetic or optical recording medium and its corresponding drive.

The input device 350 may include any conventional mechanism that permits an operator to input information to the database server 130, such as a keyboard, a mouse, a pen, voice recognition and/or biometric mechanisms, etc. The output device 360 may include any conventional mechanism that outputs information to the operator, including a display, a printer, a pair of speakers, etc. The communication interface 370 may include any transceiver-like mechanism that enables the database server 130 to communicate with other devices and/or systems. For example, the communication interface 370 may include mechanisms for communicating via a network, such as network 150 (FIG. 1).

Execution of the sequences of instructions contained in memory 330 causes processor 320 to perform the process steps that will be described hereafter. In alternative embodiments, hard-wired circuitry may be used in place of or in combination with software instructions to implement the present invention. Thus, the present invention is not limited to any specific combination of hardware circuitry and software.

The database server 130 stores information relating to various user groups. For example, according to an exemplary implementation of the invention, database server 130 stores information relating to various email groups and pager groups that include potential recipients for a notification message.

Figure 4:
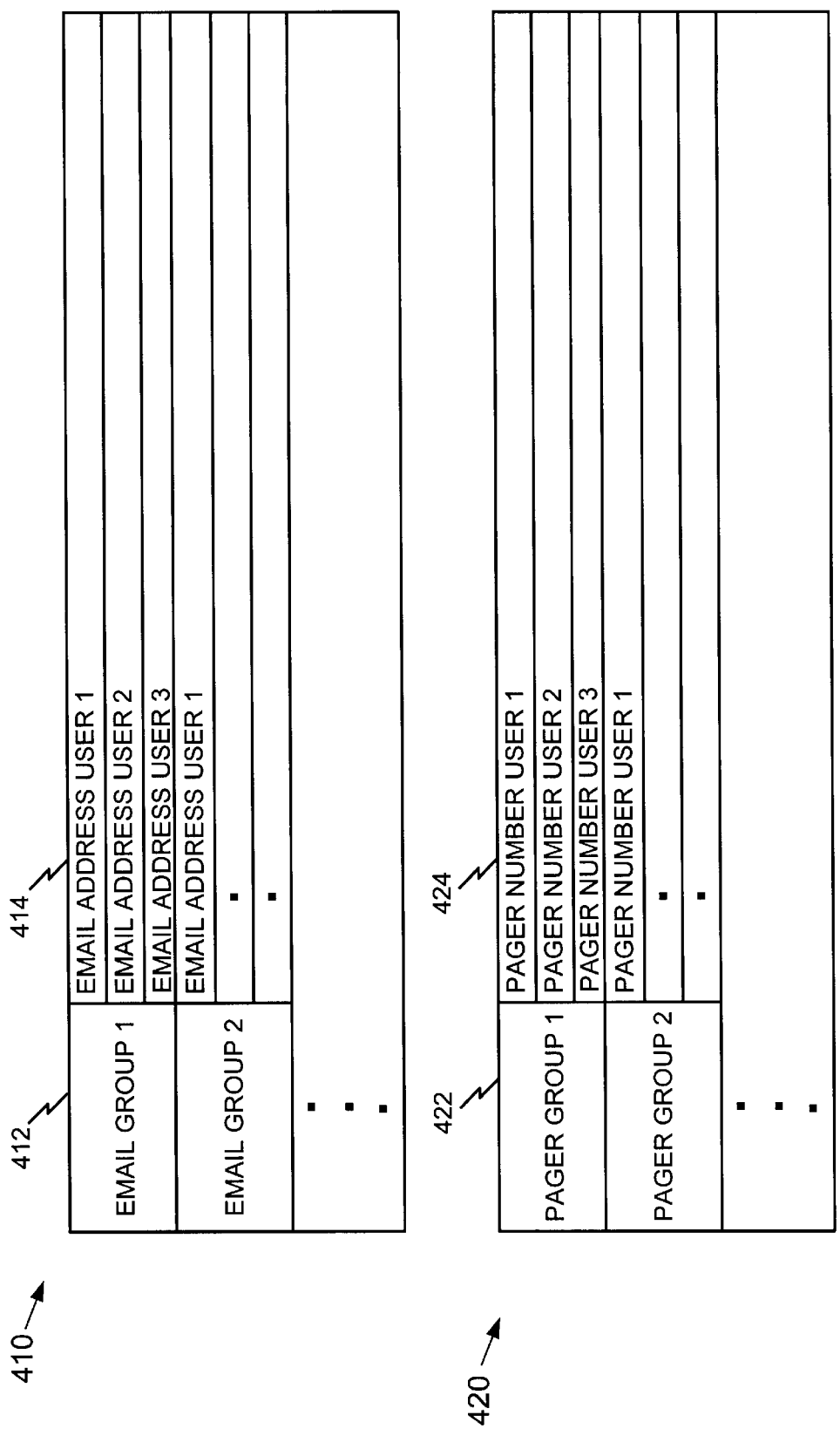
FIG. 4 illustrates a set of databases used in accordance with an exemplary embodiment of the invention.

FIG. 4 illustrates exemplary databases 410 and 420 consistent with the present invention. In an exemplary implementation, database 410 and 420 may be stored on database server 130. For example, storage device 340 may store databases 410 and 420. Alternatively, databases 410 and 420 may be stored external to database server 130 on any computer-readable medium that is accessible by database server 130. In the exemplary implementation illustrated in FIG. 4, databases 410 and 420 are shown as separate databases. In alternative configurations, however, databases 410 and 420 may be implemented as a single database.

Database 410 includes a list of electronic mail (email) groups linked to the corresponding email addresses of parties in that group. Field 412 lists the email group number and field 414 lists each of the email addresses for users in the particular email group. Each email group may include any number of users.

Database 420 includes a list of pager groups linked to the corresponding pager numbers of parties in that group. Field 422 lists the pager group number and field 424 lists each of the pager numbers for users in the particular pager group. Each pager group may include any number of users.

The information originally stored in databases 410 and 420 comes from network analysts familiar with the groups responsible for maintaining the proper operating conditions for the telecommunications network. The information in databases 410 and 420 may be changed at any time by the network analysts. Additionally, databases 410 and 420 are exemplary only and other information may be stored in these databases, based on the particular system requirements.

For example, in alternative implementations of the present invention, telephone numbers for cellular telephones or personal digital assistants (PDAs), facsimile devices and conventional telephones may be stored in databases 410 and/or 420, as described in more detail below.

Figure 5:
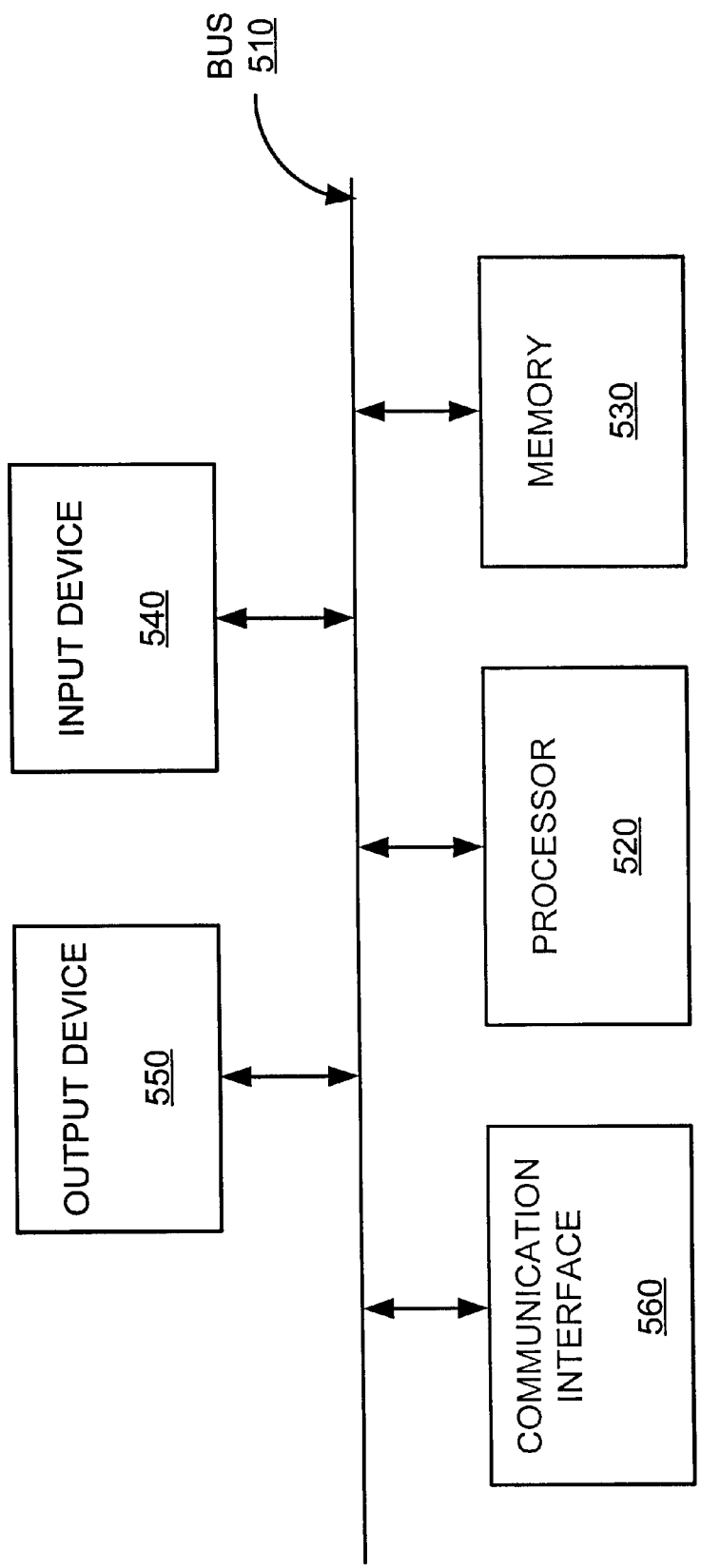
FIG. 5 is an exemplary diagram of the notification server of FIG. 1.

Returning to FIG. 1, the notification server 140 receives information from NM server 120 and database server 130 over network 150 and proceeds to prepare a notification message, as described in more detail below. FIG. 5 is an exemplary diagram of the notification server 140 consistent with the present invention. The notification server 140 includes a bus 510, a processor 520, a memory 530, an input device 540, an output device 550, and a communication interface 560. The bus 510 permits communication among the components of the notification server 140.

The processor 520 may include any type of conventional processor or microprocessor that interprets and executes instructions. The memory 530 may include a RAM or another dynamic storage device that stores information and instructions for execution by the processor 520; a ROM or another type of static storage device that stores static information and instructions for use by the processor 520; and/or some other type of magnetic or optical recording medium and its corresponding drive.

The input device 540 may include any conventional mechanism that permits an operator to input information to the notification server 140, such as a keyboard, a mouse, a pen, voice recognition and/or biometric mechanisms, etc. The output device 550 may include any conventional mechanism that outputs information to the operator, including a display, a printer, a pair of speakers, etc. The communication interface 560 may include any transceiver-like mechanism that enables the notification server 140 to communicate with other devices and/or systems. For example, the communication interface 560 may include mechanisms for communicating via a network, such as network 150 (FIG. 1).

Execution of the sequences of instructions contained in memory 530 causes processor 520 to perform the process steps that will be described hereafter. In alternative embodiments, hard-wired circuitry may be used in place of or in combination with software instructions to implement the present invention. Thus, the present invention is not limited to any specific combination of hardware circuitry and software.

EXEMPLARY PROCESSING FOR PROVIDING NOTIFICATION OF NETWORK CONDITIONS

Processing consistent with the present invention enables a user, via a workstation 110, to initiate a notification process when a change occurs in the telecommunications network. The initial notification is processed by network management server 120 and may be communicated to other users, via workstations 110, where additional information may be added. The network management server 120 then communicates with the notification server 140, which handles the transmission of the notification message.

Figure 6:
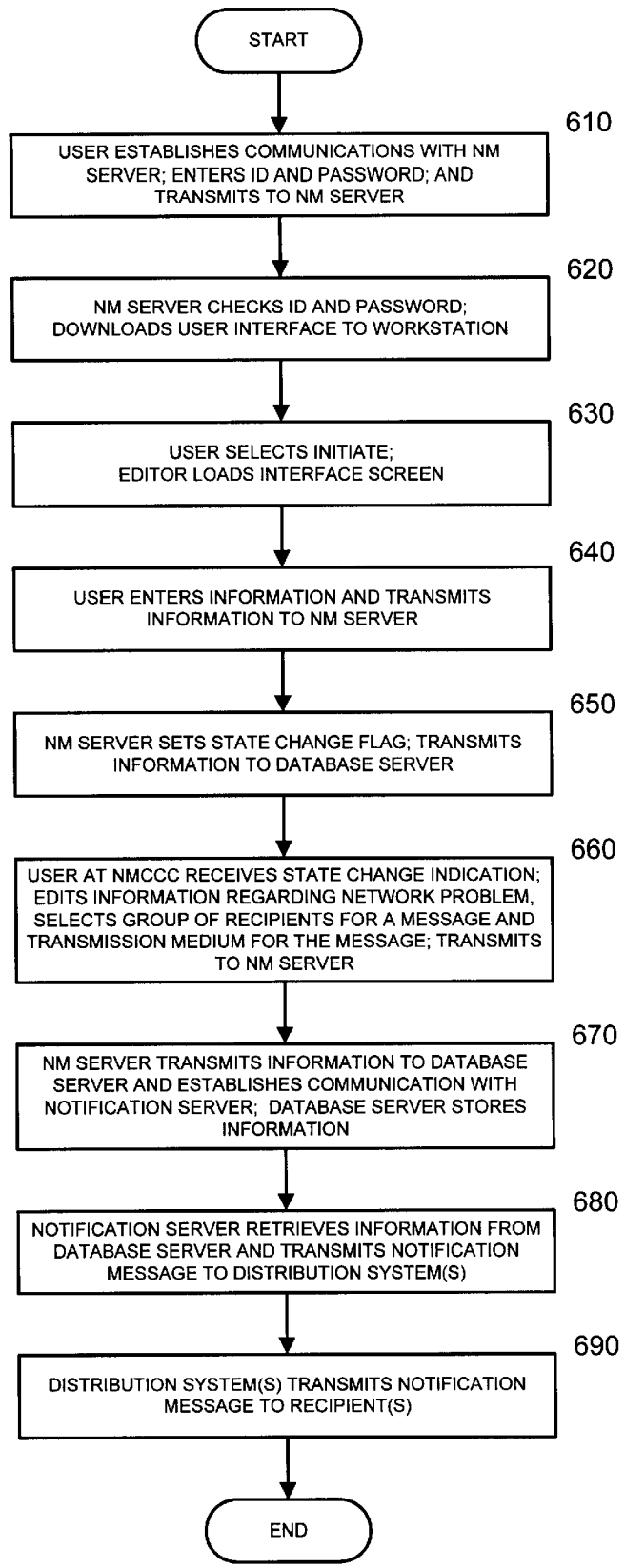
FIG. 6 is an exemplary flow diagram consistent with the present invention illustrating processing associated with transmitting a notification.

FIG. 6 is an exemplary flow diagram, consistent with the present invention, illustrating processing associated with providing a notification of network conditions. As described previously, the client/server communications between the workstations 110 and NM server 120 may be performed in any conventional manner, such as via a conventional Internet browser. Therefore, in an exemplary implementation of the invention, any workstation 110 capable of running a commonly available Internet browser can be used. Additionally, a software editor loaded onto each of the respective workstations 110 enables the user to easily input information to and retrieve information from the NM server 120. The details of the programming required to enable the client/server communications and to implement the software editor are not disclosed herein as such programming steps can be determined by one of ordinary skill in the art from the functions described herein.

Referring to FIG. 6, a user, via workstation 110, establishes a connection to the NM server 120 at step 610. The user may accomplish this via any conventional mechanism that establishes a network connection. When connection to the NM server 120 is established, the NM server 120 may download a login screen to workstation 110. The login screen may prompt the user to enter a user ID and password. The user enters an ID and password and transmits the information to the NM server 120. In alternative implementations of the invention, step 610 may be bypassed.

At step 620, the NM server 120 checks an ID/password database stored on NM server 120 to determine the validity of the user ID and password. Assuming that the ID and password are valid, the NM server 120 downloads a user interface to workstation 110. The particular user interface provided to workstation 110 at step 620 is based upon the particular user. In an exemplary embodiment of the present invention, there are two classes of users. A first class of users includes personnel located at a network management command and control center (NMCCC) and a second class of users includes all non-NMCCC users.

Assume that the user information entered at step 610 corresponds to a non-NMCCC user, the NM server 120 may download a graphical user interface (GUI) to workstation 110 that includes function buttons, such as "Initiate" and "Monitor." The Monitor function allows the user to view information relating to previous notification messages transmitted via system 100. Assume that the user selects "Initiate" at step 630. The user may select the particular function in any conventional manner, such as by placing a cursor over the function button and then clicking a mouse or pressing "Enter." The editor on workstation 110 then loads a new GUI onto the monitor at workstation 110.

Figure 7:
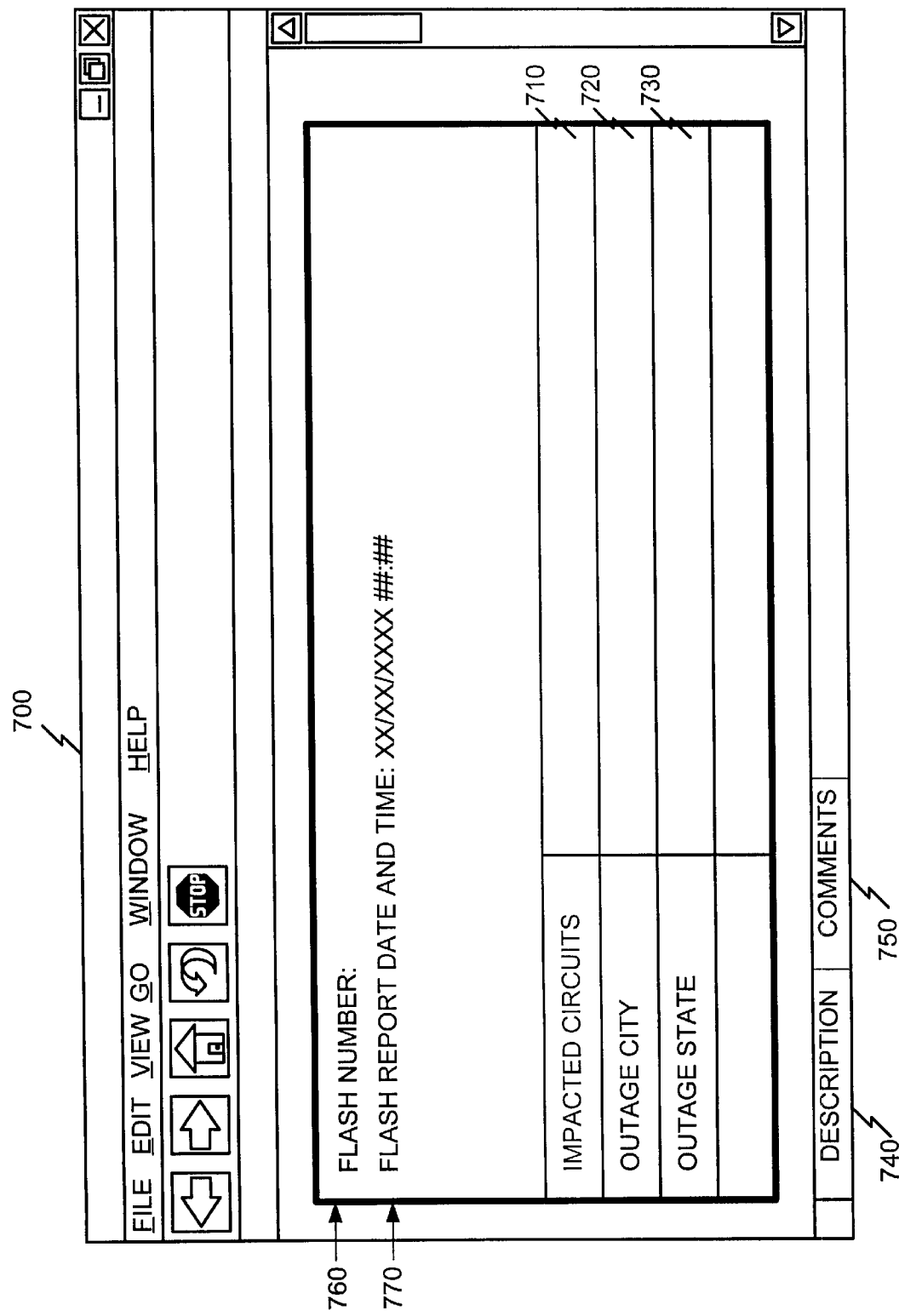
FIG. 7 illustrates an exemplary user interface screen consistent with the present invention.

FIG. 7 illustrates a simplified, exemplary interface screen 700 consistent with the present invention. The interface screen 700 includes a data field 710, labeled "Impacted Circuits." The user at step 640 may enter text in this field corresponding to the particular circuit that has failed or is experiencing problems. The interface screen 700 also includes data fields 720 and 730, labeled "Outage City" and "Outage State," respectively. The user may optionally enter information in these fields relating to the city and state where the impacted circuit(s) is located. The interface screen 700 also contains a Description button 740 and a Comments button 750, described in more detail below.

Interface screen 700 further includes fields 760 and 770, labeled "Flash Number" and "Flash Report Date and Time," respectively. The term "flash" is used to refer to a notification message transmitted via system 100. Fields 760 and 770 may be automatically provided by the NM server 120 based on the particular time that the user initiated the process. The Flash Number may be assigned after the notification message is finalized, as described below. It should be understood that the fields illustrated in screen 700 are exemplary only. Other data fields or additional data fields may be provided in alternative implementations of the present invention based on the particular network requirements. Additionally, various graphical icons may also be included on the interface screen 700 to simplify the entry of information. Further, conventional drop-down menus containing pre-stored information may also be included to simplify entry of the information.

Assume that the user selects the Description button 740. The editor on workstation 110 then loads a new interface screen which provides additional data fields where the user may further define the equipment/network problem. These fields may include "Network Problem Description," "Corrective Action Taken," "Cause of Problem," "Customer Service Impact," and "NPAs/Cities Affected." The user may optionally enter more specific information relating to the particular problem in the appropriate field. For example, in the Network Problem Description field, the user may enter information that a particular router for a particular customer failed. The user then enters the router identifier and the customer identifier along with a brief description of the problem. The user may also enter more specific information for the Correction Action Taken, Cause of Problem, Customer Service Impact and NPAs/Cities Affected fields based on the particular circumstances.

The user may also select the comments button 750. The editor on workstation 110 then provides a comments interface screen where the user may enter additional comments regarding the particular problem.

The user then transmits the information to the NM server 120 at step 640. When the NM server 120 receives this information, the NM server 120 at step 650 sets a flag indicating that a state change has occurred. The NM server 120 also transmits the received information to database server 130. The NM server 120 communicates with the database server 130 over network 150 in a conventional manner. In other implementations consistent with the present invention, the NM server 120 may store the received information in its own memory, for example, on storage device 250.

In an exemplary implementation of the present invention, workstations 110 (FIG. 1) poll the NM server 120 every predetermined period of time to determine whether a state change has been received. When the state change flag is set in NM server 120, the workstations 110 at step 660 detect the state change and the monitors for the respective workstations 110 provide an indication that a state change has occurred. The indication may be a visual or audible indicator on each of the workstations 110 or any other type of indication. In alternative implementations consistent with the present invention, the NM server 120 transmits the state change indication to the workstations 110 when it is received.

Assume that an NMCCC user receives the state change indication via a workstation 110. Further assume that the NMCCC user selects to view the state change in any conventional manner. The workstation 110 editor then loads a user interface similar to the interface screen 700.

Figure 8:
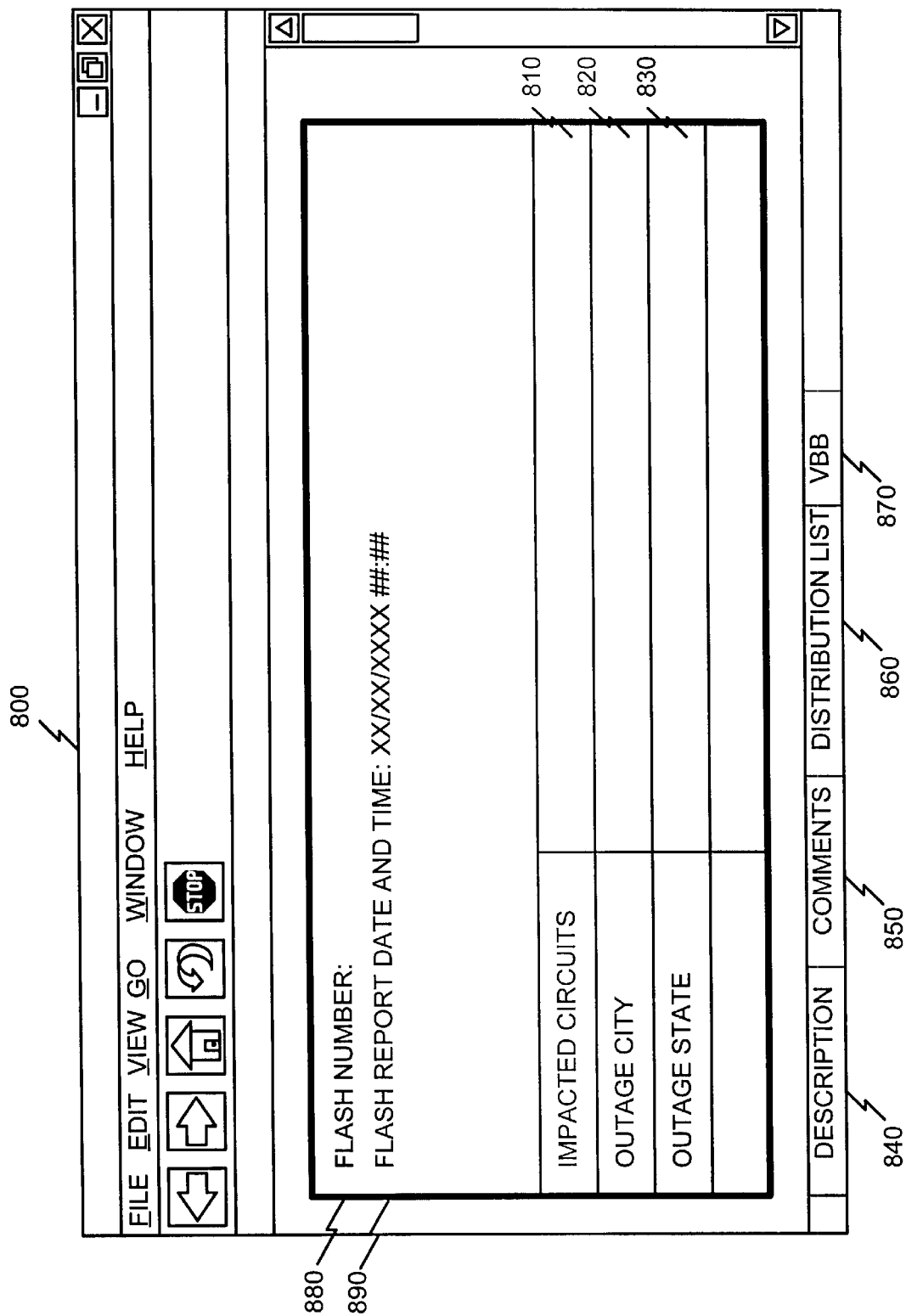
FIG. 8 illustrates an exemplary user interface screen consistent with the present invention.

FIG. 8 illustrates an exemplary interface screen for an NMCCC user consistent with the present invention. Screen 800 includes Impacted Circuits field 810, Outage City field 820, Outage State field 830, Description button 840, Comments button 850, Distribution List button 860 and video bulletin board (VBB) button 870. Screen 800 also includes Flash Number field 880 and Flash Report Date and Time field 890. The Impacted Circuits field 810 on screen 800 includes the information entered at step 640 from the non-NMCCC user's workstation 110. The user at the NMCCC may select Description button 840 and the editor will load a new interface screen similar to that provided to the non-NMCCC user, described previously. That is, the description screen may contain fields labeled "Network Problem Description," "Corrective Action Taken," "Cause of Problem," "Customer Service Impact," and "NPAs/Cities Affected." The screen loaded for the NMCCC user, however, includes all of the information entered by the non-NMCCC user at step 640. The NMCCC user may then alter or add information to any of the above fields at step 660. For example, if the NMCCC user determines the cause of the problem, the NMCCC user may enter this information in the Cause of Problem field.

The NMCCC user may also select the Comments button 850 to add any particular comments regarding the network problem. The editor on workstation 110 then loads a comments screen to permit the user to enter additional comments regarding the particular problem. The comments screen may also include an Enable Pager field and a Pager Text field. The user at the NMCCC may decide that the notification message should be sent to various personnel via a paging system. In this case, the user selects the Enable Pager field and enters a text message in the Pager Text field. As described in more detail below, the message will then be transmitted to various personnel via a paging system.

The NMCCC interface screen 800 also includes a Distribution list button 860. Assume that the user selects this button. The editor on NMCCC workstation 110 then loads a Distribution List screen that includes an Email Group field and a Pager Group field. The user may then select the email groups and/or pager groups to receive the notification message. The email groups and pager groups correspond to the email and pager groups stored in databases 410 and 420 (FIG. 4).

The NMCCC interface screen further includes a video bulletin board (VBB) button 870. The VBB is a system of cathode ray tube (CRT) monitors that displays various messages. Assume that the user selects the VBB button 870. The editor on workstation 110 loads a VBB message screen. The user, via workstation 110, may provide the text of a VBB message, a priority of the message and define a period of time in which the message is to be displayed on the CRT monitors.

In summary, at step 660 the user at the NMCCC via workstation 110, receives the state change indication, views the initial information entered by the non-NMCCC user, modifies/adds information, if necessary, and selects the recipient group(s) for the notification message. The user then submits the information to NM server 120 at step 660.

The NM server 120 at step 670 then transmits the information to database server 130 via network 150. The database server 130 then stores the information, for example, on storage device 340. In alternative implementations consistent with the present invention, the NM server 120 stores the information on the NM server 120.

The NM server 120 also initiates communication with notification server 140 over network 150 at step 670. After establishing communication with notification server 140 in a conventional manner, the NM server 120 transmits a signal to the notification server 140 indicating that a notification message awaits transmission.

The notification server 140 at step 680 processes the signal from NM server 120 and prepares the notification message for transmission to the intended recipients. More specifically, the notification server 140 accesses databases 410 and 420 to identify each of the recipient's respective email address and/or pager number. After retrieving the necessary information from database server 130, the notification server 140 transmits the notification message and associated information to various distribution systems, selected by the user at step 660, that handle the actual transmission of the message to the intended recipients.

Figure 9:
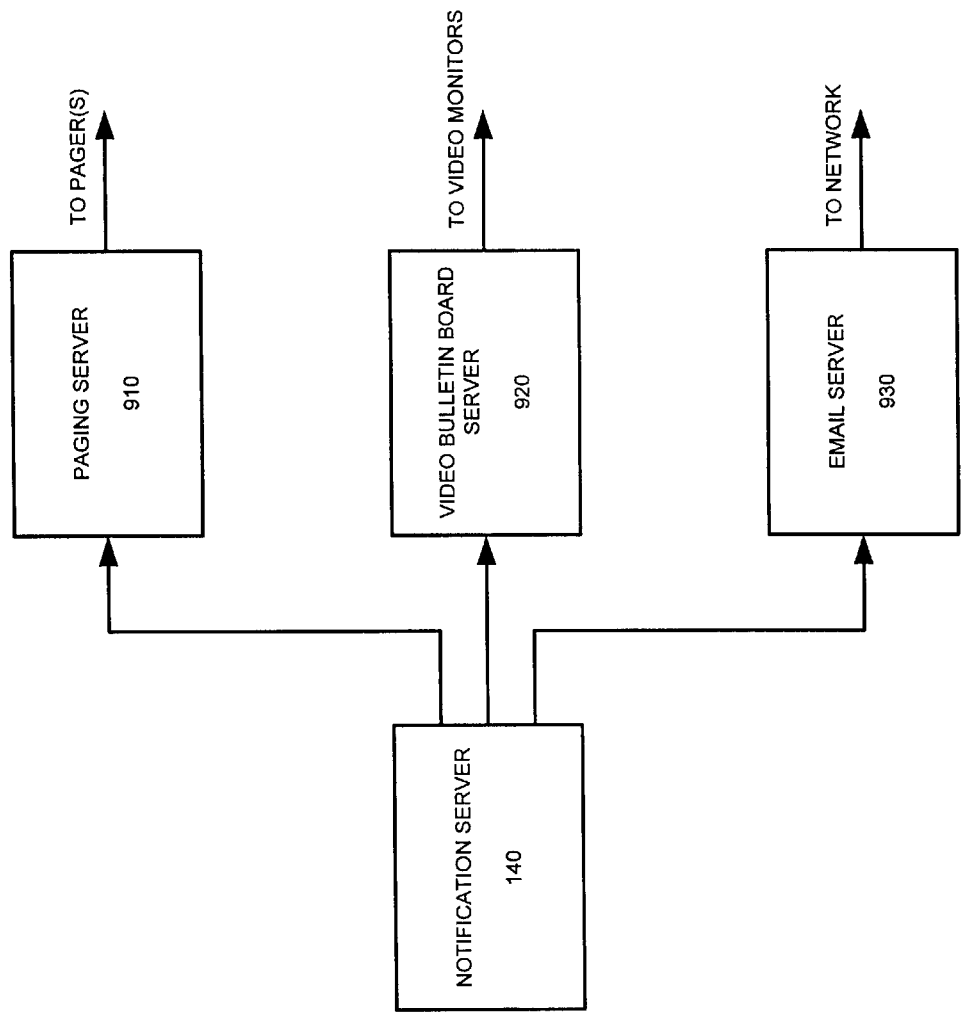
FIG. 9 is an exemplary notification system consistent with the present invention.

FIG. 9 illustrates a notification system consistent with present invention. The notification system 900 includes notification server 140, paging server 910, VBB server 920 and email server 930. The notification server 140 transmits the notification message to the respective servers 910, 920 and 930, based on the information entered by the NMCCC user at step 660.

For example, suppose the user, via workstation 110, selects the distribution list button 860 and selects various email groups and various pager groups via the distribution list screen. Further suppose that the user selects the VBB button 870 and entered a VBB message via the VBB interface screen. In this scenario, the notification server 140 transmits the corresponding messages to paging server 910, VBB server 920 and email server 930. According to an implementation consistent with the present invention, the notification server 140 converts the information input by the users via workstations 110 into the proper format for use by the paging server 910, VBB server 920 and email server 930, respectively.

More specifically, the notification server 140 transmits conventional pager text information and the associated pager numbers for each of the pagers in the selected group. The paging server 910 then transmits the message to the respective pagers in a =conventional manner. The notification server 140 also converts the VBB message inputted by the user, including its priority, into a format suitable for VBB server 920. The VBB server 920 then transmits the information to the CRT monitors in the VBB system. The notification server 140 further converts the inputted information relating to the network problem into a conventional email and transmits the email message along with the associated email address to the email server 930. The email server 930 then transmits the information to the each of the intended recipient's email address, in a conventional manner, where the recipient can view the notification message. In alternative implementations consistent with the present invention, the notification server 140 itself may transmit the email notifications to the intended recipients.

In alternative implementations of the present invention, the notification server 140 may also send a notification message to intended recipients via other systems. For example, the notification server 140 may transmit a notification message to a designated recipient's, or group of recipients, cellular telephone or PDA using a conventional short message service (SMS) or may transmit a message to the intended recipient's facsimile machine. The notification server 140 may also transmit a notification message to the recipient's conventional telephone using an automated message system. In summary, the notification server 140 may transmit a notification message to any device through which the recipient wishes to be notified of changes in status of the telecommunications network.

The exemplary processing described in relation to FIG. 6 illustrates a scenario where a non-NMCCC user initiates the notification process. The NMCCC user then receives the initial information and finalizes the notification message. In alternative implementations consistent with the present invention, the non-NMCCC user may also finalize the message and transmit the finalized message to the NM server 120 for further processing associated with transmitting the notification message. In such a scenario, the non-NMCCC user may access a distribution list screen and VBB screen for selecting the recipient(s) and systems for transmitting the notification.

In other implementations consistent with the present invention, the NMCCC user may also initiate the notification process in a manner similar to that described for the non-NMCCC user. The NMCCC user, however, may have additional functions available since the NMCCC user may have access to more information than the non-NMCCC user. The NMCCC user would then also finalize the notification message, including the selection of the recipients, as described in connection with FIG. 6.

In still further implementations consistent with the present invention, the nonNMCCC user and the NMCCC user may view the flash messages previously transmitted via system 100. The users may also modify these messages based on any change in conditions. For example, the user may call up a previously transmitted message, change some of the data and send the modified message via system 100. The change may indicate that corrective action has been taken and the problem has been resolved. Any other modifications to the previous information may also be entered. Since the information for the previous message is already stored in the database server 130, the user saves time associated with retyping the information for the revised message.

Systems and methods consistent with the present invention provide notification of network conditions. An advantage of the invention is that a user can submit a notification message and the message is automatically transmitted to the intended recipients, thereby saving time associated with calling individuals. Another advantage of the present invention is that a user-friendly interface simplifies the work required to input the message. A further advantage of the invention is that users at different levels may be assigned different levels of access. This added level of security may prevent unauthorized transmission of information to various personnel. An additional advantage of the invention is that users can view previous notification messages and modify the messages based on a change in status.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

For example, in alternative implementations consistent with the present invention, the functions of NM server 120, database server 130 and notification server 140 may be performed by a single server. Additionally, NM server 120, database server 130 and notification server 140 may communicate via mechanisms other than network 150, such as a private network or direct connections.

What is claimed is:

1. A method for providing notification regarding a change in a telecommunications network, comprising:

establishing, by a first user, a connection with a network management computer;

downloading a first user interface from the network management computer to the first user via a first workstation;

entering, by the first user via the first workstation, information relating to a change in status of a network resource;

transmitting the information relating to the change in status of the network resource to the network management computer;

receiving, by a second user via a second workstation, a state change indication relating to the change is status of the network resource;

downloading a second user interface from the network management computer to the second workstation, the second user interface comprising the information entered by the first user;

entering, by the second user via the second workstation, additional information relating to the change in status of the network resource;

selecting, by the second user via the second workstation, at least one recipient for notification of the change in status of the network resource; and automatically notifying the at least one recipient.

2. The method of claim 1, further comprising:

selecting at least one distribution system from a plurality of distribution systems for sending the notification.

3. The method of claim 2, wherein the automatically notifying includes transmitting a message to the at least one recipient via at least one of a paging system, an electronic mail system, a video display system, a telephone system, a cellular system and a facsimile system.

4. The method of claim 1, further comprising:

storing a list of electronic mail addresses and pager numbers in a memory; and accessing the memory to identify at least one of an electronic mail address and a pager number for the least one recipient.

5. The method of claim 1, wherein the automatically notifying includes:

sending a message that identifies the network resource and includes information relating to a problem with the network resource.

6. The method of claim 1, wherein the automatically notifying includes:

transmitting a message to the at least one recipient via at least one of a paging system, an electronic mail system and a video display system.

7. The method of claim 1, wherein the selecting at least one recipient comprises identifying a group of recipients, and the automatically notifying includes accessing a memory to identify at least one of electronic mail addresses for members of the group and pager numbers for members of the group.

8. A system for providing notification regarding a change in a telecommunications network, comprising:

a server coupled to a network and configured to:
receive information from a first user, the information relating to a change in status of a network resource;
download a user interface to a second user, the user interface comprising the information relating to the change in status of the network resource;
receive, from the second user, modifications or additions to the information;
receive, from the second user, a selection identifying at least one recipient for notification of the change; and
automatically notify the at least one recipient.

9. The system of claim 8, wherein the selection further identifies at least one distribution system for sending the notification.

10. The system of claim 9, wherein the at least one distribution system is selected by the second user from a group comprising at least one of a paging system, an electronic mail system, a video display system, a cellular system, a telephone system and a facsimile system.

11. The system of claim 8, further comprising:

a memory accessible to the server and configured to store at least one of pager numbers and electronic mail addresses of potential recipients of the notification.

12. The system of claim 11, wherein the server is further configured to access the memory to identify at least one of an electronic mail address and a pager number for the at least one recipient.

13. The system of claim 8, further comprising:

a paging server configured to receive information from the server and transmit a message to at least one pager.

14. The system of claim 8, wherein the server is further configured to transmit a message to the at least one recipient via electronic mail.

15. The system of claim 8, wherein the selection identifies a group of recipients and the server is further configured to access a memory to identify at least one of electronic mail addresses for members of the group and pager numbers for members of the group.

16. In a network comprising a plurality of workstations, a method for providing notification regarding a change in a telecommunications network, comprising:

inputting, by a first user at a first workstation, information relating to a change in status of a network resource, the first user being associated with a first level of users;

sending the information to a first server;

transmitting the information to a second workstation;

inputting, by a second user at the second workstation, information representing at least one recipient for a notification relating to the change in status, the second user being associated with a second level of users, the second level of users having more authority with respect to entering information relating to the change in status of the network resource than the first level of users;

selecting, at the second workstation, at least one system from a plurality of systems for sending the notification;

transmitting the information from the second workstation to the first server; and sending the notification to the at least one recipient.

17. The method of claim 16, wherein the plurality of systems comprises at least one of a paging system, an electronic mail system, a video display system, a telephone system, a cellular system and a facsimile system.

18. The method of claim 16, further comprising:

storing in a memory a list of electronic mail addresses and pager numbers of potential recipients of the notification; and accessing the memory to identify at least one of an electronic mail address and a pager number for the least one recipient.

19. The method of claim 16, wherein the sending the notification includes transmitting a message that identifies the network resource and includes information relating to a problem with the network resource.

20. The method of claim 16, wherein the sending the notification includes:

transmitting, from the first server to a second server, a signal indicating that a message is ready to be sent;

accessing a memory, by the second server, to identify the at least one recipient and the message to be transmitted to the at least one recipient; and sending the message to the at least one recipient.

21. A computer-readable medium having stored thereon a plurality of sequences of instructions, said sequences of instructions including sequences of instructions which, when executed by a processor, cause said processor to perform a method comprising:

obtaining identifying information from a user;

transmitting a user interface to the user based on the identifying information;

obtaining, from the user, information representing a change in status of a network resource, the information identifying at least one impacted circuit and location information associated with the impacted circuit;

identifying at least one recipient for a notification message relating to the impacted circuit;

sending the notification message to the at least one recipient;

transmitting, after obtaining the information representing the change is status, a state change indicator to a plurality of workstations; and obtaining information from at least one of the plurality of workstations, the information representing additional information relating to the network resource.

22. The computer-readable medium of claim 21, causing said processor to perform the further steps of:

setting an indicator when the change in status is received.

23. A computer-readable medium having stored thereon a plurality of sequences of instructions, said sequences of instructions including sequences of instructions which, when executed by a processor, cause said processor to perform a method comprising:

transmitting a user interface to a user;

obtaining, via the user interface, information relating to a change in status of a network resource, the information identifying at least one impacted circuit, location information associated with the impacted circuit, and a plurality of recipients for a notification relating to the impacted circuit;

accessing a memory based on the received information to identify the plurality of recipients for the notification; and automatically transmitting the notification to the plurality of recipients.

24. The computer-readable medium of claim 23, wherein the automatically transmitting includes sending a message to the plurality of recipients via at least one of a paging system, an electronic mail system, a video display system, a telephone system, a cellular system and a facsimile system.

* * * * *